March 26, 1940.　　K. BRENKERT　　2,194,585
MOTION PICTURE PROJECTOR
Filed Oct. 25, 1938　　2 Sheets-Sheet 1

INVENTOR.
Karl Brenkert
BY Samuel Weisman
ATTORNEY.

March 26, 1940.  K. BRENKERT  2,194,585
MOTION PICTURE PROJECTOR
Filed Oct. 25, 1938  2 Sheets-Sheet 2

INVENTOR.
Karl Brenkert
BY Samuel Weisman
ATTORNEY.

Patented Mar. 26, 1940

2,194,585

UNITED STATES PATENT OFFICE 2,194,585

MOTION PICTURE PROJECTOR

Karl Brenkert, Detroit, Mich., assignor to Brenkert Light Projection Company, Detroit, Mich., a corporation of Michigan Application October 25, 1938, Serial No. 236,917

4 Claims. (Cl. 88—17)

The present invention pertains to a motion picture projector. One of the objects is to provide a novel means for framing the film against the aperture plate when threading. Ordinarily, this is done directly at the aperture of this plate, with the assistance of the pilot light behind the aperture. This light, being in the path of the projection beam, must be moved out of the path of the beam when the machine is in operation. The moving of the pilot lamp into and out of its operative position behind the aperture constitutes additional manipulations that must be performed by the operator in setting and starting the machine.

According to the present invention, an auxiliary film registering means such as an aperture is provided at the plate out of the path of the projection beam and preferably above the normal aperture. Such auxiliary aperture is preferably of the same size as the normal aperture and spaced therefrom a distance equal to a multiple of the height of an exposure. The auxiliary aperture is of course traversed by the film in threading the latter and is therefore adapted to register with an exposure when the film is properly framed in the normal aperture. In other words, the auxiliary aperture rather than the normal aperture is used for framing when threading.

The provision and use of the auxiliary registering means in the manner described enables better sighting in framing, when threading unobstructed by the gate, and also does away with the necessarily movable pilot light. A fixed pilot light is provided behind the auxiliary means and is turned on and off by an external switch as required. Since the auxiliary registering means and the plot light behind it are out of the path of the projected beam, there is no necessity of moving the pilot light into and out of position.

Another object of the invention is to provide a simple and effective means of cooling the aperture plate and indirectly the film, without an arc-disturbing air current or a light absorbing baffle lens. This object is accomplished primarily by the use of a fan or a blower adapted to draw a current of atmospheric air across the aperture plate, with baffles or fins for transferring heat to the air current. The system is preferably isolated in a restricted section of the housing in such a manner that the current of air is restricted substantially to the aperture plate and shut off from other parts of the housing not requiring such intensive cooling.

The invention is fully disclosed by way of example by the following description and the accompanying drawings, in which.

Reference to these views will now be made by use of like characters that are employed to designate corresponding parts throughout.

Figure 1:
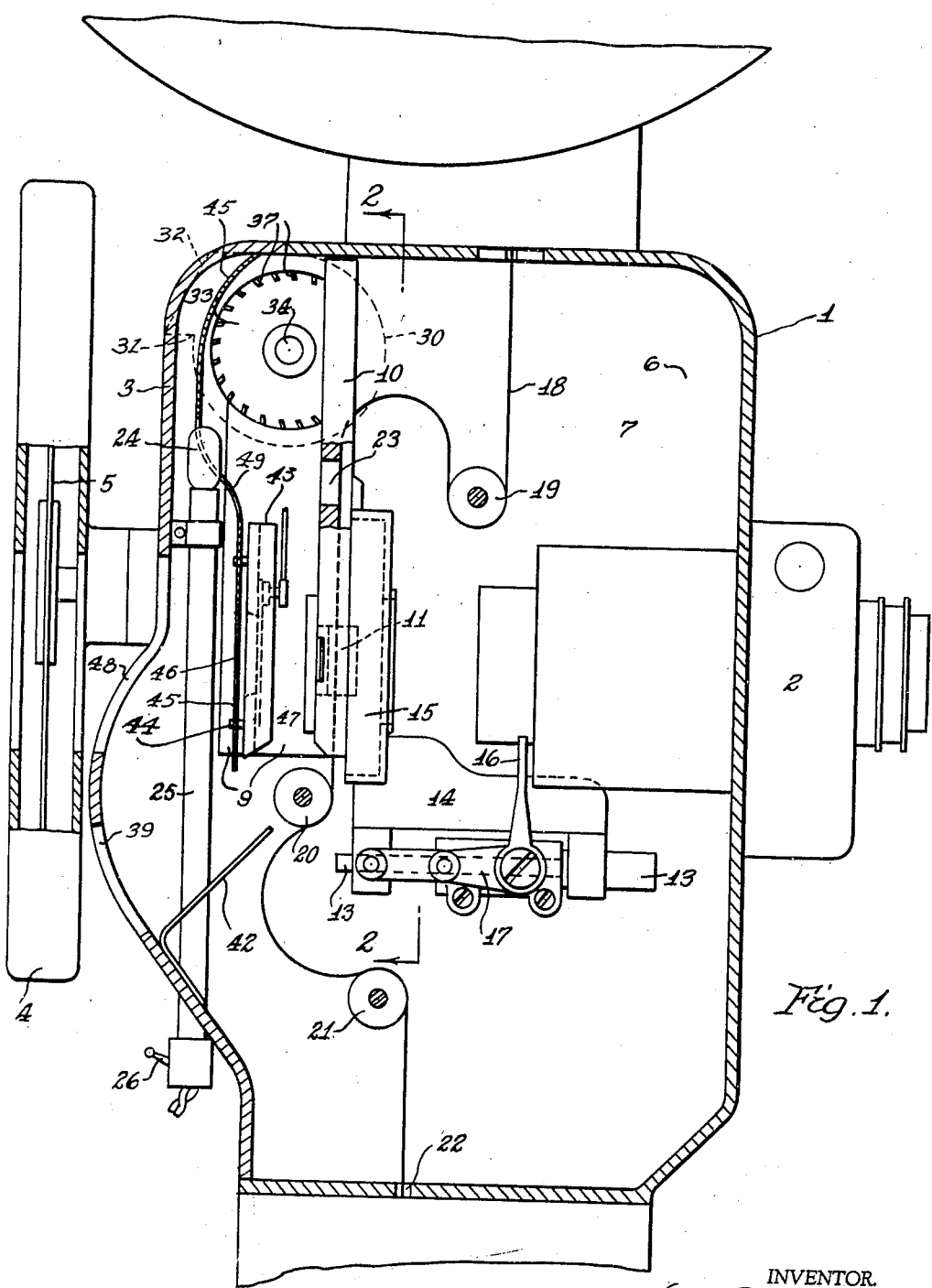
Figure 1 is a vertical section of the projector, taken lengthwise of the machine.

In Figure 1 is shown a projector casing 1 of more or less conventional design with a lens mounting 2 at its forward wall. The rear wall 3 is a separate part, as shown, and supports the shutter housing 4 in which is mounted a rotatable shutter 5 of suitable design and driven by any suitable means.

Within the casing 1 is provided a lengthwise partition 6 dividing the interior of the casing into a film compartment 7 and a mechanism compartment 8, as described more completely in my co-pending application, Serial Number 217,385, filed July 5, 1938. At the upper part of the partition 6 is a right angled bracket having a lengthwise leg 9 extending along the partition, at the film compartment side thereof, and a transverse leg 10 extending across the film compartment. The leg 10 is embodied in the aperture plate assembly and has a projection aperture 11 formed therein in the usual manner. The bracket 9, 10 may be supported in any suitable manner, as an integral part of the casing or the partition or fastened to either of these parts.

Along the partition are supported a pair of horizontal guide rods 12 and 13 one above the other. On these rods is slidably mounted a carriage 14 carrying a gate 15 adapted to engage the aperture plate in the usual manner. A lever 16 is pivotally mounted on the lower rod 13 and connection to the rear end of the carriage by a toggle 17. Thus, the gate 15 can be retracted from the aperture plate by manipulation of the lever 16 or by any conventional means for the purpose.

The film 18 leading from the feed magazine (not shown) at the top of the projector is passed beneath a feed sprocket 19, across the aperture 11 in the member 10, into engagement with the intermittent sprocket 20 and over the take-off sprocket 21 from which it passes through a slot 22 in the bottom of the casing 1 to a receiving magazine (not shown). Between the sprockets 19 and 20, the film engages the member 10 vertically over a substantial area and must be framed with respect to the aperture 11, as is well known in the art.

In the member 10 is provided an auxiliary film registering means illustrated as an aperture 23 above the gate 15 and of the same size as the aperture 11, or the size of an exposure on the film. It will be evident that the auxiliary means may take other forms such as a horizontal slit, an index finger or any device against which the film can be illuminated and registered. It is understood in this connection that it is sufficient to register only the upper or lower edge of the exposure in the auxiliary means. Corresponding points of the aperture 11 and the auxiliary means, such as points thereof for registering with corresponding points or horizontal lines on the two exposures, are spaced apart a distance equal to the combined height of a whole number of exposures. A small electric light 24 is supported behind the aperture 23, in substantially horizontal alignment therewith, preferably by the rear wall 3 of the housing 1, to illuminate the film against the auxiliary means.

In prior devices, the film is framed directly at the aperture 11 with the aid of a pilot light in line with the aperture and necessarily removable from the beam of projected light when not in use. Such a removable lamp requires extra manipulations by the operator in framing the film when threading and preparing the machine for operation, in addition to numerous other operations that cannot be avoided. Because of the location of the auxiliary aperture 23 in the relation described, out of the path of the projected beam, the pilot light 24 need not be shifted from one position to another and to that extent reduces the number of manipulations in framing the film. The lamp 24 is preferably supported at the upper end of a column 25, the lower end of which extends through the rear wall 3 and carries a manual switch 26 for the lamp. Also, sighting of the film is easier and better at the auxiliary registering means than through the gate 15 or through the space between the gate and the film, as in prior practice.

Figure 2:
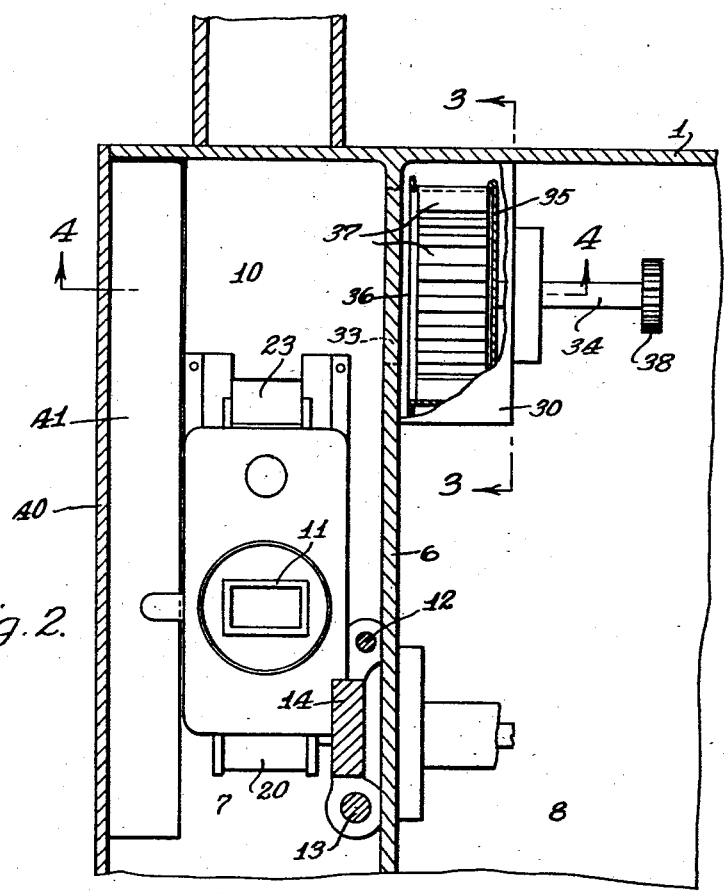
Figure 2 is a transverse vertical section on the line 2—2 of Figure 1.
Figure 3:
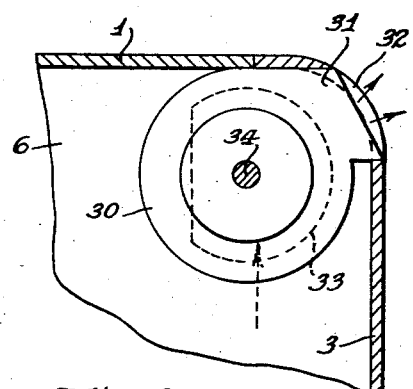
Figure 3 is a section on the line 3—3 of Figure 2.
Figure 4:
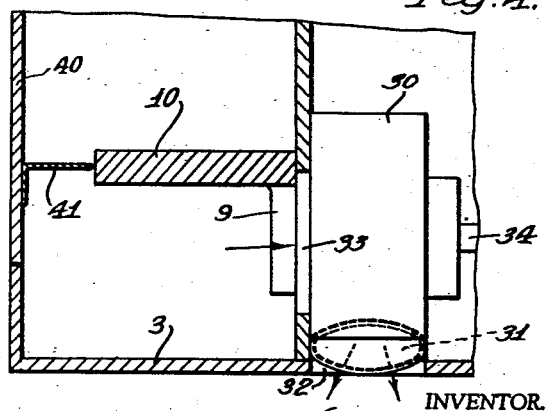
Figure 4 is a section on the line 4—4 of Figure 2.

The mechanism for cooling the film from the heat of the projection lamp includes a blower housing 30 supported preferably at the top of the partition 6 and formed with a discharge duct 31 extending into an opening 32 in the top of the rear wall 3, as shown in Figure 3. The partition 6 has an opening 33 communicating with a side of the housing 30, and the bracket side 9 terminates below this opening, as shown in Figures 2 and 4.

A hollow shaft 34 is rotatably mounted in the axis of the housing 31 and carries a fan or blower consisting of a cylinder 35 having an open side 36 adjacent to the opening 33. Blades 37 are bent inward from the circular wall of the cylinder in a manner to draw air through the opening 33 when the motor is set in motion.

The housing 30 is preferably located in the mechanism compartment 8, and the shaft 34 is extended somewhat into this compartment and equipped with a pinion 38. The pinion is suitably geared to the usual film propelling mechanism in the compartment 8.

The rear wall 3 is formed with a port 39 to permit air to be drawn by the blower from the atmosphere and along the portion of the film exposed to the projection beam. The air is discharged through the duct 31 and opening 32.

The space immediately surrounding the aperture plate, where the film is exposed to the projection beam, is substantially closed off from the remainder of the film compartment to prevent dissipation of the current of cooling air and to confine this current to the limited space in which the cooling action is necessary. The space is partially enclosed by the rear wall 3, the top of the casing 1, the partition 6 and the bracket leg 10. The side door 40 hinged in the usual manner, carries a vertical fin 41 substantially engaging the free vertical edge of the bracket side 10 when the door is closed, or the bracket may be wide enough to be engaged by the door without a fin. From the rear door 3 extends a baffle 42 towards the lower end of the bracket side 10, or in close proximity to the sprocket 20, as shown in Figure 1. The last named parts complete the enclosure of the aperture plate and confine the air current to the exclusion of the remainder of the film compartment which requires no forced cooling.

To provide additional cooling surface in the enclosure, the fire shutter frame 43 carries a number of pins 44 on which is supported a fin or baffle 45 extending to the top of the housing 1. The baffle has a rectangular opening 46 reducing the area of the beam so that it has only a slight overlap or spill around the aperture of the fire shutter frame 43. Thus, the major part of the stray or marginal light is cut off by the baffle which in turn readily transfers the accompanying heat to the air current created by the blower. Transfer of heat from the fire shutter frame to the aperture plate is materially obstructed by the air space 47 between the parts. Whatever heat is picked up by the aperture plate, by conduction through member 9 or otherwise, is drawn off by the air current along the aperture plate.

To prevent formation of a current of air through the light-admitting port 48, which current might disturb the arc of the projection lamp, the baffle 45 is extended to cover the intake of the blower, as shown in Figure 1. The air must flow along the extended portion and hence absorb heat from it. The baffle is apertured at 49 to accommodate the lamp 24. Additional baffles may be provided in the air stream if desired.

Heretofore it has been customary to bend the shutter blades so that they force a current of air into or out of the housing. Such current, however, disturbs the sensitive arc of the flaming type of arc lamp, unless a lens is inserted between the shutter and the arc, and such a lens reduces the optical efficiency of the system. It is evident that the system described herein neither disturbs the arc no reduces the optical efficiency.

The blower recited in the appended claims signifies any means of creating a current of air between itself and the opening 39 either by suction or by pressure.

Although a specific embodiment of the invention has been illustrated and described, it will be understood that various alterations in the details of construction may be made without departing from the scope of the invention, as indicated by the appended claims.

What I claim is:

1. In a motion picture projector, a housing, a partition separating said housing into a film compartment and a mechanism compartment, an aperture plate extending from said partition into said film compartment, a blower having one side communicating with the atmosphere, said housing having an opening communicating with the other side of said blower in a path including said plate, a side door for said film compartment, a portion of said door being adapted to close against the adjacent vertical edge of said plate, whereby to obstruct communication between said opening and in front and laterally of said plate.

2. In a motion picture projector, a housing, a partition separating said housing into a film compartment and a mechanism compartment, an aperture plate extending from said partition into said film compartment, a blower having one side communicating with the atmosphere, said housing having an opening communicating with the other side of said blower in a path including said plate, a side door for said film compartment, a portion of said door being adapted to close against the adjacent vertical edge of said plate, and a baffle mounted on a wall of said housing and extending towards the lower edge of said plate, said partition, plate, wall, and baffle forming an obstruction between said opening and parts in front and laterally of said plate.

3. In a motion picture projector, a housing, an aperture plate spaced from the rear wall of said housing, means cooperating with said plate and rear and lateral walls of said housing to form a substantially enclosed chamber, a blower having one side communicating with the atmosphere and the other side communicating with said chamber, one of said walls having an opening to the atmosphere, said plate lying between the last named opening and said blower, the rear wall of said housing having a light-admission port in line with said aperture plate, and a baffle in said chamber between said blower and port to preclude formation of an air current through said port.

4. In a motion picture projector, a housing, an aperture plate spaced from the rear wall of said housing, means cooperating with said plate and rear and lateral walls of said housing to form a substantially enclosed chamber, a blower having one side communicating with the atmosphere and the other side communicating with said chamber, one of said walls having an opening to the atmosphere, said plate lying between the last named opening and said blower, the rear wall of said housing having a light-admission port in line with said aperture plate, and a baffle in said chamber between said blower and port to preclude formation of an air current through said port, and a fire shutter frame disposed between said baffle and aperture plate and spaced substantially from the latter.

KARL BRENKERT.

Disclaimer 2,194,585.—*Karl Brenkert*, Detroit, Mich. MOTION PICTURE PROJECTOR. Patent dated Mar. 26, 1940. Disclaimer filed Oct. 21, 1948, by the assignee, *American Pattern & Manufacturing Co.*

Hereby enters this disclaimer of claims 1 and 2 of said patent.

[*Official Gazette November 16, 1948.*]